April 24, 1956  J. W. RANDALL  2,742,826
METHOD OF AND MEANS FOR PRODUCING MACHINE-MADE TUBULAR
BAGS WITH GUSSET-FOLDED SIDES
Filed Feb. 28, 1951  5 Sheets-Sheet 1

April 24, 1956   J. W. RANDALL   2,742,826
METHOD OF AND MEANS FOR PRODUCING MACHINE-MADE TUBULAR
BAGS WITH GUSSET-FOLDED SIDES
Filed Feb. 28, 1951   5 Sheets-Sheet 3

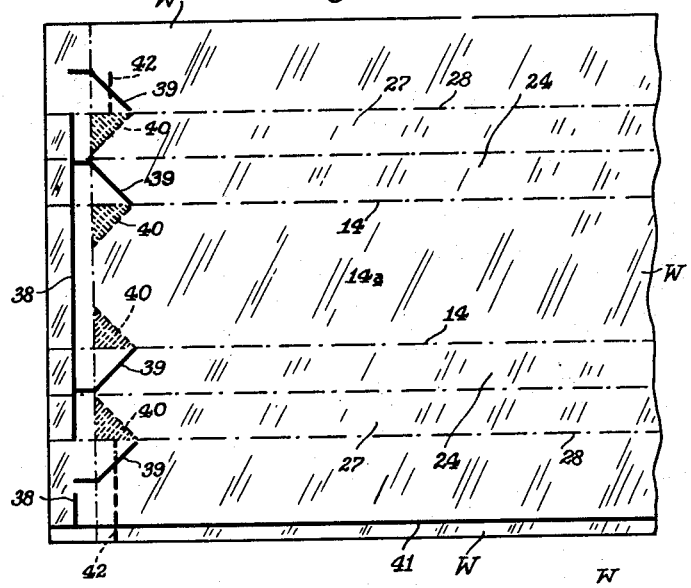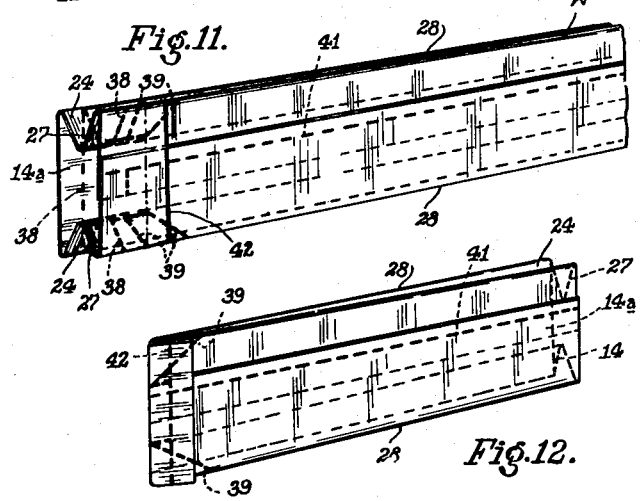

United States Patent Office 2,742,826
Patented Apr. 24, 1956

2,742,826

METHOD OF AND MEANS FOR PRODUCING MACHINE-MADE TUBULAR BAGS WITH GUSSET-FOLDED SIDES

John William Randall, Boxmoor, Hemel Hempstead, England, assignor to John Dickinson & Co. Limited, Apsley Mills, Hemel Hempstead, England, a British company Application February 28, 1951, Serial No. 213,112

Claims priority, application Great Britain May 23, 1950

9 Claims. (Cl. 93—20)

The present invention relates to the production of machine-made tubular bags, with gusset-folded sides, of the kind commonly known in the art as satchel bags. Such bags, which are made from paper or equivalent pliable sheet materials, are adapted to fold substantially flat when empty and closed and to exhibit comparatively wide extended sides and a more or less flat bottom when opened for use.

In the bag-making machines employed in the manufacture of tubular satchel bags, it is a common practice to employ elongated former plates which are superimposed upon the flat blank or web of bag-making material whilst the longitudinal side edges of the material are folded and tucked over the corresponding longitudinal side edges of the former plates to produce the required gusset folds, prior to or whilst forming the bag-tube.

A known form of tubular bag-making machine employing such gusset-folding former plates can conveniently be used to manufacture plain self-opening satchel bags by forming the bag-making material into tubular shape with infolded longitudinal side gussets, then folding over the bottom or tail end of the bag tube (including the bottom of the side gussets) with one or a plurality of external folds and securing the external folded end portion to the bottom end of the outer wall of the bag tube by means of a suitable externally-applied adhesive.

It is well known, however, that satchel bags, when produced as above described, have a disadvantage in that a finely granular substance, e. g. a dry powder, placed in such a bag which has not been fully opened by hand is apt to become firmly lodged between the internal gussets at the lower end of the partly opened bag and thus interfere with the full and correct opening out of the bag during the filling thereof. Moreover, the corners of a gusset-folded tubular bag made in the manner above described are not tightly sealed and therefore allow finely granular substances to leak therefrom.

It has been found that the above described disadvantages in regard to machine-made satchel bags, as hitherto produced, could substantially be overcome by sealing the inner contacting surfaces of the bottom folds of the bags with adhesive and particularly by employing diagonal strips or triangular areas of adhesive at the ends or corners of the bottom fold areas of the bags. Obviously, however, the employment of flat former plates, as above described, in producing the gusset folds in the sides of such bags precludes the application of stripes or areas of adhesive to the internal surfaces of the bottom folds of the bag prior to the formation of the gusset-folded bag tube, since certain of the said internal fold surfaces make sliding contact with the flat former plates in the gusset-fold forming operations and the adhesive will be offset in an undesirable manner. Consequently, self-opening satchel bags with satisfactorily sealed bottoms as hitherto made by machines and particularly when produced upon modern high speed, tubular bag-making machines are generally of the more elaborate flat-folding block bottom construction and the operations involved in the various known methods employed in the mechanically producing such flat-folding block bottom bags entail the use of mechanism different from that which is normally employed in the production of machine-made satchel bags. For example, one method of producing block bottom gusset-folded tubular bags by means of a high speed, continuous web, tubular bag making machines comprises forming a tube of paper or other sheet material from a continuously fed web of the material, opening out one end of the tube in a direction transverse to the longitudinal axis of the tube and then infolding the opened out end edges of the tube. The last described operation may be effected by mechanical fingers or other deflecting means inserted in the leading end of the bag tube and then drawn apart so that the end of the tube is folded into substantially a square with two of its edges infolded so as to lie parallel with the centre line of the square; the closure then being completed by folding over the two corners of the said square in a direction transverse to the length of the tube. The folded over bottom portions of the bag tube are arranged for sealing in overlapped relation with the infolded edges of the tube so as to seal the completed closure. Numerous mechanical alternatives have been proposed to carry out the folding operations above described, but it will be apparent to those skilled in the art of bag making that in any case such operations entail the use of more complicated and expensive mechanism than is normally employed in the production of satchel bags. Thus, the operating costs and risk of mechanical trouble are increased and the operative range of the machines tend to become more limited.

One object of this invention is to provide a modified and improved method of producing gusset-folded bag tubes which is applicable to the production of the satchel bags with the bottom fold or folds thereof tightly sealed by application of adhesive to the internal contacting surfaces thereof.

Another object of the present invention is to provide modified and improved means for forming longitudinal gusset folds in machine-made gusset-folded tubular bags, without the use of former plates of the kind usually employed for the purpose as described above.

A further object of the invention is to provide a modified and improved bag-making machine for carrying the novel method of the present invention into effect.

According to one feature of the present invention, provision is made of a method of forming a machine-made bag-tube with longitudinal gusset folds by passing the bag-making material through a first fold-forming means which is adapted to define in the material the outer longitudinal edges of the first gusset folds and turn over the longitudinal marginal parts of the material about the said outer longitudinal fold edges in continuously formed curls or whorls, thereby to produce the first gusset folds infolded over the central longitudinal parts of the material, then passing the part-folded material through a second fold-forming means which is adapted to define the inner longitudinal fold edges of the first formed gusset folds and fold back the longitudinal margins of the material about the said inner gusset fold edges to form the second gusset folds, and thereafter to define the outer fold edges of the second-formed gusset folds and infold the longitudinal margins of the material about the last-defined outer longitudinal fold edges to complete the bag-tube.

According to another feature of the invention, provision is made of a method of mechanically producing satchel bags with the bottom fold surfaces thereof internally sealed with adhesive, comprising the steps of drawing the bag-making material in a continuous web from a supply reel, feeding the unfolded material to an adhesive-applying section or through successive adhesive-applying sections for applying bottom-sealing transverse stripes and, if required, diagonal stripes and/or areas of adhesive and longitudinal seaming stripes or linings of adhesive to the inner surface of the material, passing the adhesive-coated material around a forming roller or equivalent non-rotatable member to initiate the formation of the first longitudinal gusset folds, ploughing over the longitudinal margins of the material in continuous curls or whorls to produce the first gusset folds, passing the part-folded material to a second forming roller or equivalent non-rotatable member to produce the second gusset folds and define the longitudinal outer fold edges thereof, infolding the longitudinal margins of the material to complete the formation of the bag-tube with the longitudinal seaming areas in overlapping relation, and thereafter passing the formed tube to bottom folding and delivery means.

According to another feature of the invention, means for forming machine-made bag-tubes with longitudinal gusset folds comprise a supporting surface for the moving material and a forming roller or equivalent non-rotatable member arranged to form, in association with the supporting surface, a throat through which the longitudinal centre part of the bag-making material is passed to initiate the formation of longitudinal folds in the material along fold lines defining the outer fold edges of the first gusset folds, side guides disposed to engage and deflect the longitudinal folds of the material as the latter moves over the said supporting surface, so that each of the said folds is passed along a sinuous path and thus turned over to form a first gusset fold disposed over the central longitudinal part of the material, a forming roller or equivalent means positioned to engage the moving part-folded material to define the inner longitudinal fold edges of the first gusset folds and deflect the longitudinal marginal parts of the material outwardly to form second gusset folds over the first formed gusset folds, said roller or equivalent member also serving to define the outer longitudinal fold edges of the second formed gusset folds and marginal portions of the material which form the rear face of the bag-tube, and means for infolding the said longitduinal marginal portions of the gusset-folded material to complete the bag tube and bring the longitudinal seaming edges thereof into overlapping relation.

The novel bag-making method and means of this invention enables machine-made bag-tubes with longitudinal gusset-holes to be produced without bringing former plates or equivalent members into adhesive-offsetting contact with the adhesive-coated areas of the inner surface of the bag-material and, therefore, can be applied in producing, as a machine-made article, a satchel bag with the bottom fold areas thereof internally sealed with adhesive. Such satchel bags may be produced with either single-ply or multi-ply walls.

The method of this invention and exemplar forms of apparatus for carrying the method into effect will hereinafter be more particularly described with reference to the accompanying drawings in which:

Fig. 10 is a plan view of a portion of a bag-forming web showing the areas to which adhesive may be applied prior to forming the material into a satchel bag with internally sealed bottom folds by the method and means of the present invention;

Fig. 11 is a perspective representation of the bag tube formed by folding the blank shown in Fig. 10; and Fig. 12 is a perspective view of the completed bag.

Figure 1:
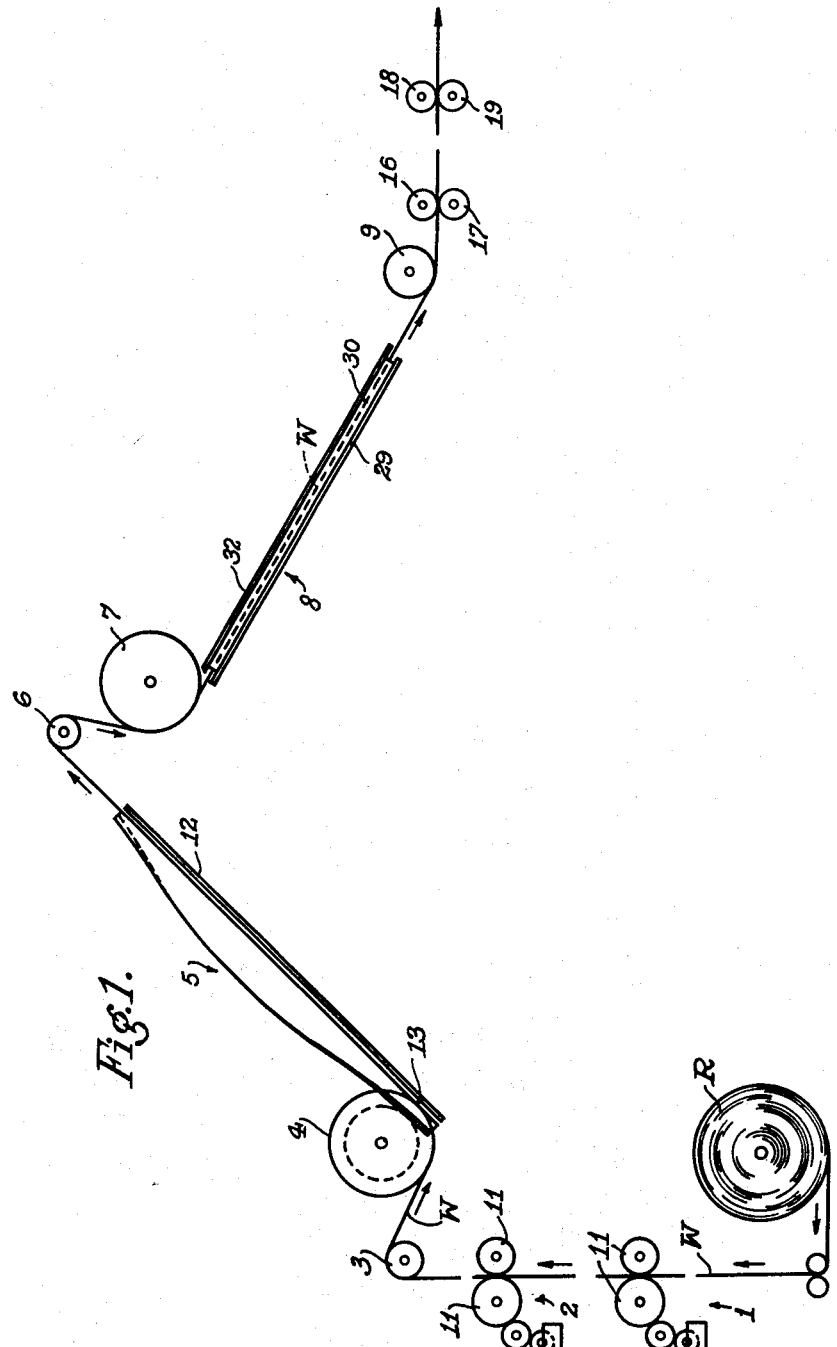
Fig. 1 is a purely schematic side elevational lay-out of the adhesive-applying, gusset-folding and bag-tube forming sections of a continuous web-fed tubular bag forming machine constructed and adapted to operate in accordance with the present invention.

Referring to Fig. 1 of the accompanying drawings, R indicates a reel carrying the paper or other material from which the tubular bags are formed, and W the continuous web of material drawn from the reel R by feed roller pairs 16, 17 and 18, 19, the action of which is hereinafter more fully described.

1 indicates a first adhesive-applying section for applying transverse stripes and if required diagonal corner stripes and/or triangular corner patches or areas of adhesive to the bottom fold areas of the inner surface of the web W. 2 indicates a second adhesive-applying section for applying a continuous longitudinal stripe or lining of adhesive in the longitudinal seaming area of the inner surface of the web W.

3 is a first direction-breaking roller whereby the adhesive-coated web W is directed to a first fold forming roller 4; 5 indicates a first gusset-fold forming section; 6 is a second direction-breaking roller whereby the partly folded web is directed to a second forming roller 7; 8 indicates a second-fold-forming section incorporating means for completing the formation of the bag-tube; and 9 is a third direction-breaking roller whereby the fully formed gusset-folded bag tube is directed to the feed roller pairs 16, 17 and 18, 19.

The adhesive-applying sections may each comprise a known form of gum bath or box 10 and associated train of gumming rollers 11. As will be fully appreciated by those skilled in the art, the specific arrangement of the gumming boxes and rollers is subject to considerable variation, to provide for the application of adhesive to different areas of the web W, as required. Means for effecting such variation of the adhesive applying arrangements are well known in the art and need not be further described in this connection.

The forming roller 4 is arranged to initiate the formation of the first longitudinal folds in the web along fold lines 14 (see Fig. 10) which form the outer fold edges of the first gusset folds and also define therebetween the approximate width of one face 14a, hereinafter called the front face of the formed bag tube.

In the example shown, the forming roller 4 has a concave peripheral surface and is mounted in a freely rotatable manner so as to extend across the lower end of a stationary web-supporting plate 12 which comprises an element of the first gusset-fold forming section 5. The web-supporting plate 12 is provided with a convexly curved web-supporting surface so that the curved surfaces of the plate and roller 4 form therebetween a curved open ended throat 13 of restricted height and approximately equal in width to the width of the front face 14a of the formed bag tube. The outer peripheral edges 4a of the forming roller 4 are arranged to define the fold lines 14 and to initiate the upward folding deflection of the longitudinal margins of the web W.

The forcing roller 4 has a longitudinal slot or recess 15 in the curved peripheral surface thereof, as shown, or a plurality of slots or recesses, which is or are adapted to register with the transverse adhesive-coated areas of the inner surface of the web and thus prevent contact between the roller and adhesive. In some cases, however, forming rollers without clearance slots or recesses may be used as hereinafter described.

The above described forming roller 4 is obviously limited to use in producing bags of a certain width and, therefore, may be mounted in a manner which permits the roller readily to be removed and replaced by another roller of different width for each size of bag produced within the range of the machine. The forming rollers of different widths may also be of different diameters for a reason hereinafter made clear.

It is convenient but not essential to employ a freely rotatable forming member 4 and, if desired, use could be made of an intermittently rotatable roller or a non-rotatable member or members adapted periodically to be moved clear of the web to avoid contact with the transverse adhesive-coated areas of the web.

The first gusset-fold forming section 5 comprises an opposite-hand pair of profiled side guide members 20, 21 mounted upon the supporting plate 12 and extending longitudinally thereof in mutually spaced relation. The rear ends 22 of the lower edges of the guide members 20, 21 extend to the longitudinal axis of the roller 4, i. e. to the throat 13, and are outwardly offset from the ends of the roller to form a web-receiving mouth which is appreciably wider than the throat. The rear parts of the lower guide edge 22 curve inwardly to join forwardly extending straight parts 23 of the lower edges of the guide members, which straight lower edge parts 23 are disposed in mutually paralled relation to provide a web-guiding passage suitable for the width of the completed bag tube.

Figure 2:
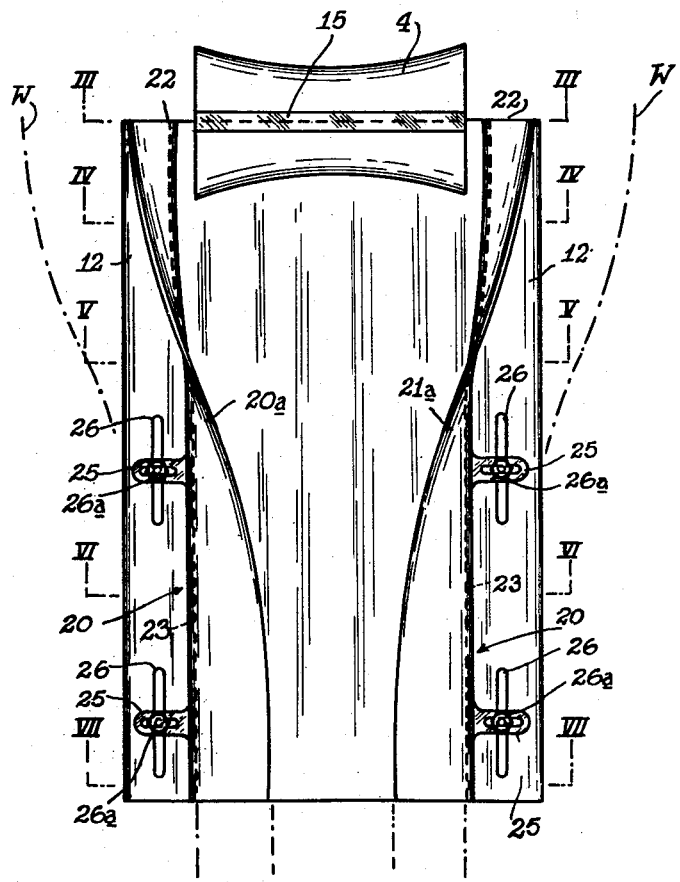
Fig. 2 is a diagrammatic plan view of the first gusset-fold forming arrangement.
Figure 3:
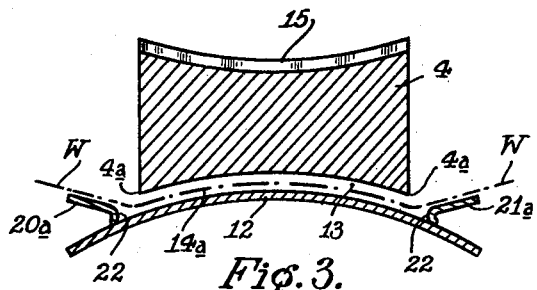
Figs. 3 to 7 are cross sectional views taken upon lines III—III to VII—VII respectively of Fig. 2.
Figure 4:
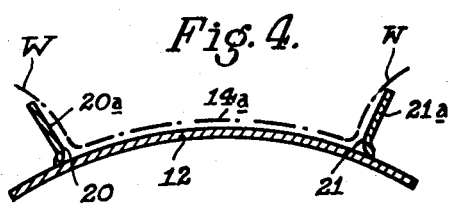
Figure 5:
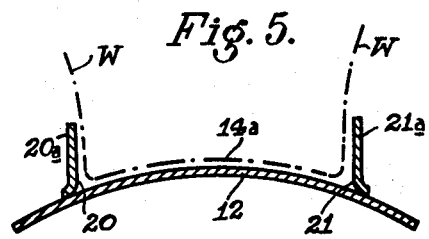
Figure 6:
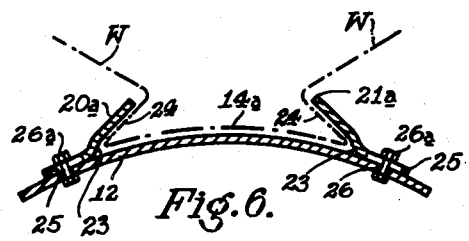
Figure 7:
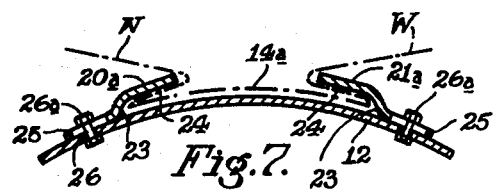
Figure 8:
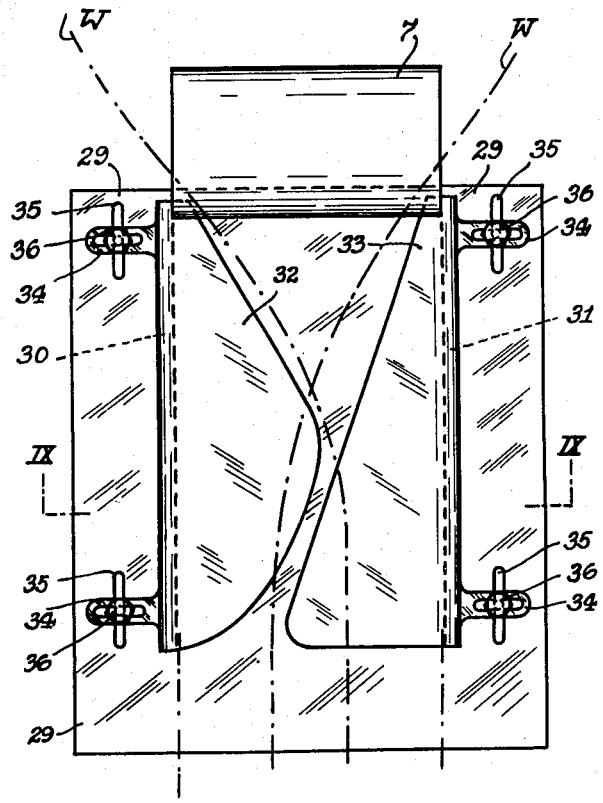
Fig. 8 is a diagrammatic plan view of the second gusset-fold and bag-tube forming arrangement.

The upstanding walls 20a, 21a of the side guide members 20, 21 respectively are each curved in a spiral or helical curvature about a longitudinal axis and through an angle of approximately 150 degrees so that the inner side face of each guide wall is directed upwards at the rear or web-receiving end of the guide passage (see Figs. 2 and 3) and twists inwards (as shown in Figs. 4–7) to assume the downwardly directed position shown in Fig. 7. The side guides are thus adapted to function substantially in the manner of plough-shares so that the initially folded or upwardly deflected longitudinal margins of the web W are progressively turned over to form the first gusset folds 24.

The side guide members are adapted to be both longitudinally and laterally adjustable upon the supporting plate 12 in order to accommodate the gusset fold section to webs and forming rollers of various widths in setting the machine for producing bags of various sizes. To this end, the side guide plates may be provided with laterally projecting, slotted lugs 25 which extend across longitudinally extending slots 26 formed in the supporting plate 12 and are clamped to the plate by bolts 26a passed through the intersecting slots in the plate and lugs.

The second breaker roll 6, in directing the partly folded web W to the second forming roller 7 also acts to press down or iron out the first gusset folds 24 which are formed as the web passes through the fold section 5.

The second forming roller 7 which, in the form shown, has a cylindrical peripheral surface with well defined peripheral end edges, is substantially equal in width to the forming roller 4. The roller 7 serves to deflect or fold back the longitudinal margins of the web so as to form the inner longitudinal fold edges of the first-formed gusset-folds 24 and second gusset folds 27, while the peripheral end edges of the forming roller 7 serve to define the outer longitudinal fold edges of the second gusset folds and marginal portions of the web which together constitute the rear face of the formed bag tube.

As in the case of the first forming roller 4, the forming roller 7 may be freely rotatable and mounted in a readily removable manner so that other forming rollers of different width (and of different diameter if necessary) may be substituted in setting the machine for making bags of different sizes.

It may be necessary or desirable to provide a longitudinal slot or clearance (not shown) or a plurality of such slots or clearances in the peripheral surface of the forming roller 7 to avoid contact between the roller and the transverse adhesive coated areas of the web surface as described above with reference to the first forming roller 4.

In the case of either forming roller, however, it may be preferred to use a roller having a circumferential length which is equal to the length of the bag tube in production or equal to exact multiples of the bag tube length. Thus, the roller surface may be permitted to contact the adhesive-coated areas of the web surface without risk of offsetting the adhesive upon other following parts of the web which should remain free from adhesive.

It is, at present, also considered to be practicable to employ means for cleaning unwanted adhesive from the working surfaces of the forming rollers between successive fold-forming operations. Known means such as water doctoring devices could be adapted for the required purposes, but the use of such known roller cleaning means for avoiding undesirable offsetting of the adhesive may lead to complication in the design and construction of the bag-making machine and, therefore, the first described means for avoiding the offsetting of the adhesive are considered to be less expensive and, probably, more reliable in operation.

The second fold forming section 8 comprises a web-supporting plate or frame 29 extending longitudinally from the bottom of the forming roller 7 and carrying a pair of side guide members 30, 31 which are adjustably mounted upon the plate or frame 29 in mutually parallel relation to form a web-guiding passage leading from, and of the same width as, the forming roller 7. Flap folding plates 32, 33, with suitably cut-away inner longitudinal edges, are carried by the side guide members 30, 31 respectively so as to extend inwardly across the web-guiding passage between the side guide members. The folding plates 32, 33 which may be flat as shown, or curved in the manner of ploughshares, are held in spaced relation to the web supporting plate or frame 29 to provide a clearance for the passage of the gusset-folded web.

The side guide members 30, 31 and flap folding plates 32, 33 are longitudinally and laterally adjustable to accommodate forming rollers 7 and webs W of different widths and, to this end, each side guide member is provided with laterally extending slotted lugs 34 which lie across longitudinal slots 35 formed in the support plate or frame 29 and are clamped to the latter by bolts 36 which pass through the intersecting slots in the lugs and plate or frame.

The third direction-breaking roller 9, in directing the folded web to the feed roller pairs 16, 17 and 18, 19, also serves to press down or iron-out the completed longitudinal folds of the formed bag-tube.

The feed roller pairs 16, 17 and 18, 19 may be arranged periodically to make and break gripping contact with the folded web in alternating sequence, e. g. by known timing cam means, not shown, in order to avoid squeezing out the adhesive from the adhesive-coated transverse areas of the internal surfaces of the bag tube.

In the operation of the web-folding arrangement above described, the web W is drawn continuously from the reel R by the feed roller pairs 16, 17 and 18, 19 and in passing through the adhesive-applying section 1, receives upon the inner surface of the web i. e. the surface which eventually forms the inner surfaces of the bag tube, across stripes of adhesive 38 disposed along those areas of the web which will eventually form the bottom cross folds of the completed bag, and diagonal stripes 39 and/or triangular patches 40 of adhesive upon those areas of the web which will form the internal contacting surfaces of the opened-out bottom of the folded bag, (see Fig. 10).

Thereafter, the web passes through the adhesive-applying section 2 to receive the continuous longitudinal seaming stripes or lining 41 of adhesive in an area which will form a lap of the longitudinal seam of the completely folded bag-tube.

The web then passes around the direction-breaking roller 3 and first forming roller 4 with the inner adhesive-coated surface of the web uppermost. The roller 4 initiates the formation of the first gusset folds 24 and directs the longitudinal portion of the web into the throat 13. The curvature of the throat and forwardly extended support plate or frame 12 transversely tensions and stiffens the centre portion of the web and facilitates the upward curl of the fold edges of the web.

As the central part of the web which lies between the outer fold edges of the first gusset fold travels between the lower edges 22, 23 of the curved side guide members 20, 21, the longitudinal marginal portions of the web are turned or ploughed over by the curved walls 20a, 21a of the side guide members and deflected inwards in a continuous curl or whorl so as to become tucked beneath the forward ends of the guide members in the consecutive stages of turning movement shown in Figs. 3–7. When the web leaves the fold section 5 the first longitudinal gusset folds 24 have been formed therein and these folds are pressed down or ironed out as the partly folded web is passed around the direction-breaking roller 6. The web then passes around the second forming roller 7 which outwardly deflects the free marginal edges of the web to form the second gusset folds 27 and define the longitudinal fold lines 28 i. e. outer fold edges of the gusset folds 27 and the rear face flaps of the bag tube.

Figure 9:
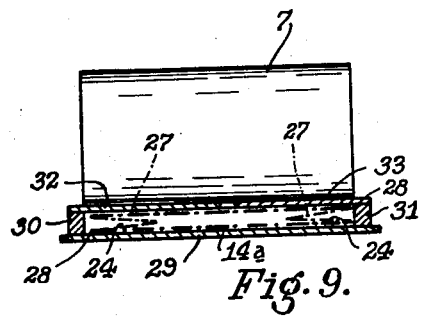
Fig. 9 is a cross sectional view taken on line IX—IX of Fig. 8.

Thereafter, as the web is drawn beneath the forming roller 9 and into the adjacent end of the fold section 8, the central portion of the web and longitudinal gusset-folded edges thereof pass direct beneath the flap-folding plates 32, 33 whilst the outer free margins of the web i. e. the rear face flaps of the bag-tube are directed upwards around the ends of the forming roller 9 and then curled under the fold plates 32, 33 so as to come together in partly overlapped relation in completing the formation of the bag-tube (as shown in Fig. 9).

Upon leaving the fold section 8, the completely formed bag tube is drawn around the direction-breaking roller 9 which serves to press down or iron out the longitudinal gusset folds of the bag tube.

The formed bag tube is then forwarded by the feed roller pairs to the subsequent operations by known means for applying the external fold-securing transverse stripes of adhesive 42 to the outer wall of the bag tube, severing the bag tube into the bag-forming lengths, folding over the bottom ends of the bag lengths to complete the bags (as shown in Fig. 12) and delivering the completed bags.

The machines for carrying the method of the present invention into effect are not restricted to the arrangements described above. For example, in place of stationary curved side guide members which plough over the edges of the web, use may be made of series of rollers arranged in sinuous lines or belts so as to engage and turn over the edges of the web, while the freely rotatable forming rollers may be replaced by intermittently rotatable rollers or by non-rotatable displaceable members which are periodically displaced to avoid contact with the transverse adhesive-coated areas of the web.

The gusset-folding sections constructed as above described in accordance with the above invention may be used generally in tubular bag-making machines e. g. machines designed for producing satchel bags with tubular gusset-folded bodies and block bottoms.

I claim:

1. A method of forming a machine-made bag-tube with longitudinal gusset folds, including the steps of passing the bag-making material through a marginally upwardly angularly directed and centrally upwardly curved first fold-forming means to centrally curve upwardly to transversely tension and longitudinally stiffen a central portion of the material and to sharply define in the material the outer longitudinal edges of the first gusset folds, the said central curving being in a direction opposite to the folding of the outer edges of the first gusset folds and between said fold edges, and to turn over the longitudinal marginal parts of the material about the said outer longitudinal fold edges in continuously formed curls or whorls, thereby to produce the first gusset folds infolded over the central longitudinal parts of the material, and then to define the inner longitudinal fold edges of the first formed gusset folds and fold back the longitudinal marginal parts of the material about the said inner gusset fold edges to form the second gusset folds, and then passing the part-folded material through a second fold-forming means to define the outer fold edges of the second formed gusset folds and infold the longitudinal margins of the material about the last defined outer longitudinal fold edges to complete the bag tube.

2. Means for forming machine-made bag-tubes with longitudinal gusset folds, comprising a source of supply of bag-making material, means for drawing a continuous web of the material from the said source of supply, a supporting surface for the moving material, first fold-forming roller means adjacent and arranged to form in conjunction with the said supporting surface a throat through which the longitudinal centre part of the bag-making material is passed to initiate the formation of the longitudinal folds in the material along fold lines defining the outer fold edges of the first gusset folds, side guides extending from the sides of and directed first outwardly and then inwardly over the supporting surface disposed to engage and deflect the longitudinal folds of the material as the latter moves over the said supporting surface, from between the roller means and surface so that each of the said folds is passed along a sinuous path and thus turned over to form a first gusset fold disposed over the central longitudinal part of the material, and then to define therein the inner longitudinal fold edges of the first gusset folds and means to deflect the longitudinal marginal parts of the material outwardly over said side guides to form second gusset folds folded over the first formed gusset folds, a second forming means to define the outer longitudinal fold edges of the second gusset folds and marginal portions of the material which form the rear face of the bag-tube, and means for infolding the longitudinal marginal portions of the gusset-folded material to complete the bag-tube and bring the longitudinal seaming edges thereof into overlapping relation.

3. Means for forming machine-made bag-tubes with longitudinal gusset folds, comprising a source of supply of bag-making material, means for drawing a continuous web of the material from the said source of supply, a supporting surface for the moving material, first fold forming means arranged to form in conjunction with the said supporting surface a throat through which the longitudinal centre part of the bag-making material is passed to initiate the formation of longitudinal folds in the material along fold lines defining the outer fold edges of the first gusset folds, side guides disposed to engage and deflect the longitudinal folds of the material so that each fold is passed along a sinuous path and thus turned over to form a first gusset fold disposed over the central longitudinal part of the material as the latter moves over the said supporting surface, and then to define therein the inner longitudinal fold edges of the first gusset folds and means to deflect the longitudinal marginal parts of the material outwardly over said guides to form second gusset folds folded over the first formed gusset folds, said first forming means being concave in its transverse sense curving opposite to the fold lines defining the outer fold edges of the first gusset folds, and the material-supporting surface being convex in its transverse sense, thereby transversely to tension or stiffen the material and facilitate the folding of the longitudinal margins thereof, second fold forming means to define the outer longitudinal fold edges of the second gusset folds and marginal portions of the material which form the rear face of the bag-tube, and means for infolding the longitudinal marginal portions of the gusset-folded material to complete the bag-tube and bring the longitudinal seaming edges thereof into overlapping relation.

4. Means as claimed in claim 2, wherein the peripheral surface of the forming roller means is made concave and the said material-supporting surface is made convex in the transverse sense curving opposite to the fold lines defining the outer fold edges of the first gusset folds, thereby transversely to tension or stiffen the material and facilitate the folding of the longitudinal margins thereof which project outwards from the ends of the throat and edges of the said supporting surface.

5. Means as claimed in claim 2, wherein the said side guides comprise elongated profiled members having longitudinally extending lower edges and upper side walls, the said lower edges of which provide therebetween a guideway for the central longitudinal part of the material extending between the outer fold edges of the first gusset folds, while the said upper side walls of the said side guide members are curved with a spiral curvature so as to engage and turn over the longitudinal margins of the material in the manner set forth.

6. Means as claimed in claim 3, wherein the said side guides comprise elongated profiled plates having longitudinally extending lower edges and upper side walls, the said lower edges providing a guideway for the central longitudinal part of the material extending between the outer fold edges of the first gusset folds, while the said upper side walls of the said side guide plates are curved with a longitudinally extending helical curvature so as to engage and plough over the longitudinal margins of the material in the manner set forth.

7. Means as claimed in claim 2, wherein the forming roller means is provided with at least one slotted recess in the peripheral surface thereof to avoid contact between the said peripheral surface of the roller means and adhesive-coated areas of the inner surface of the web of bag-making material.

8. Means as claimed in claim 3, wherein the first forming means is a roller provided with at least one slotted recess in the peripheral surface thereof to avoid contact between the peripheral surface of the said roller and adhesive-coated areas of the web of bag-making material.

9. Means as claimed in claim 2 including means to periodically relieve the contact of the peripheral surface of the first fold-forming roller means from the web to avoid contact between the said peripheral surface of the roller means and adhesive-coated areas of the inner surface of the web of bag-making material.

References Cited in the file of this patent

UNITED STATES PATENTS

| | | |
|---|---|---|
| 155,563 | Woodhull | Sept. 29, 1874 |
| 410,122 | Stillwell | Aug. 27, 1889 |
| 670,761 | Bowen | Mar. 26, 1901 |
| 1,003,658 | Robinson | Sept. 19, 1911 |
| 1,053,655 | Sherrard | Feb. 18, 1913 |
| 1,753,354 | Stickney | Apr. 8, 1930 |
| 1,792,388 | Neumiller | Feb. 10, 1931 |
| 1,816,361 | Coty | July 28, 1931 |
| 2,054,486 | Sargent | Sept. 15, 1936 |
| 2,149,872 | Schmidt | Mar. 7, 1939 |